(12) United States Patent
Santurbane et al.

(10) Patent No.: US 9,598,142 B2
(45) Date of Patent: Mar. 21, 2017

(54) SUPPORT ASSEMBLY FOR A BICYCLE FRONT DERAILLEUR

(71) Applicant: SRAM, LLC, Chicago, IL (US)

(72) Inventors: Mark Santurbane, Colorado Springs, CO (US); Brian Jordan, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 131 days.

(21) Appl. No.: 14/568,692

(22) Filed: Dec. 12, 2014

(65) Prior Publication Data

US 2016/0167742 A1 Jun. 16, 2016

(51) Int. Cl.
*B62M 9/135* (2010.01)

(52) U.S. Cl.
CPC .................................. *B62M 9/135* (2013.01)

(58) Field of Classification Search
CPC ..... B62M 9/135; B62M 9/1344; B62M 9/137
See application file for complete search history.

(56) References Cited

U.S. PATENT DOCUMENTS

| 4,279,172 A | 7/1981 | Nagano et al. |
| 7,722,487 B2 | 5/2010 | Ichida et al. |
| 2004/0185975 A1 | 9/2004 | Chen |
| 2005/0204846 A1* | 9/2005 | Valle ..................... B62M 9/135 74/469 |
| 2006/0258494 A1* | 11/2006 | Auer ..................... B62M 9/135 474/80 |
| 2012/0280097 A1 | 11/2012 | Pasqua |
| 2013/0085024 A1 | 4/2013 | Inoue et al. |
| 2016/0167741 A1* | 6/2016 | Emura ................... B62M 9/135 280/281.1 |

FOREIGN PATENT DOCUMENTS

| EP | 1571076 | 9/2005 |
| JP | 53-102549 | 9/1978 |
| JP | 62-177594 | 11/1987 |

\* cited by examiner

*Primary Examiner* — William E Dondero
*Assistant Examiner* — Robert T Reese
(74) *Attorney, Agent, or Firm* — Milan Milosevic; Lisa Serdynski (57) ABSTRACT

A support assembly for supporting a front derailleur at a bicycle frame is provided. The bicycle frame includes a longitudinal axis, a support portion arranged lengthwise about the longitudinal axis and a mounting portion projecting outwardly from the support portion. The front derailleur includes a base member attachable to the mounting portion of the bicycle frame at a derailleur mounting axis. The base includes a support mounting surface facing the bicycle frame. The support assembly includes a support member and a support member mount. The support member is displaceable relative to the base member along the support mounting surface of the base member. The support member includes a contact surface configured to contact the support portion of the bicycle frame. The support member mount is configured to attach the support member to the support mounting surface of the base member.

72 Claims, 9 Drawing Sheets

SUPPORT ASSEMBLY FOR A BICYCLE FRONT DERAILLEUR

BACKGROUND OF THE INVENTION

The invention relates to a support assembly for supporting a bicycle front derailleur.

Bicycle front derailleurs are in most cases mounted to a section of a bicycle frame, for example to a section of a seat tube. At the location intended for mounting a front derailleur, a mounting fixture for the derailleur is usually provided. Such a mounting fixture may be integrally formed with the bicycle frame. Alternatively, mounting fixtures may be either glued, brazed, welded, screwed or clamped to the frame, for example to a section of the seat tube. The mounting fixtures are arranged or formed at the bicycle frame before mounting the derailleur to the bicycle frame. Due to this pre-attachment of the mounting fixture to the frame, the angular position of the derailleur must be adjustable to allow a proper alignment and functioning of the derailleur. Therefore the orientation and position of the derailleur is adjusted in order to set the correct orientation and position of the chain guide relative to the sprockets. Thereafter, the adjusted position is fixed by a derailleur mounting member such as a screw or a bolt.

When shifting between different sprockets with the derailleur, it is possible that the orientation and position of the derailleur or the chain guide with respect to the sprocket changes. This can be due to the fact that the mounting fixture attached to the bicycle frame may flex under the influence of chain loading forces. This may influence the shifting performance of the derailleur.

Therefore, there is a need to provide a front derailleur for a bicycle with additional lateral support for securely maintaining the position and orientation of the derailleur. Moreover, the additional lateral support should be easy to set while avoiding damage to the bicycle frame.

SUMMARY OF THE INVENTION

An object of the invention is to provide a support assembly for a front derailleur that maintains the front derailleur's position and orientation securely, after having adjusted the position and orientation of the front derailleur.

In accordance with the one embodiment of the invention, the above object can be attained by providing a support assembly for supporting a front derailleur at a bicycle frame. The bicycle frame includes a longitudinal axis, a support portion arranged lengthwise about the longitudinal axis and a mounting portion projecting outwardly from the support portion. The front derailleur includes a base member attachable to the mounting portion of the bicycle frame at a derailleur mounting axis. The base member includes a support mounting surface facing the bicycle frame. The support assembly includes a support member and a support member mount. The support member is configured to displace relative to the base member along the support mounting surface. The support member includes a contact surface configured to contact the support portion of the bicycle frame. The support member mount is configured to attach the support member to the support mounting surface of the base member of the front derailleur.

When the derailleur is attached to the bicycle frame by a derailleur mounting assembly and the orientation and position of the derailleur has been properly adjusted and fixed, the support member is displaced in a direction parallel or a direction at an acute angle to the derailleur mounting axis until the contact surface of the support member contacts the support portion of the bicycle frame. The contact between the support portion of the frame and the support member provides an additional lateral support, besides the attachment of the base member to the mounting portion of the bicycle frame, in order to maintain the position and orientation of the derailleur securely.

The mounting and support portions of the frame may include a derailleur mounting fixture that attaches the derailleur to a seat tube of the frame. The contact surface of the support member contacts the support portion of the bicycle frame. Hence, the contact surface of the support member may either directly contact a portion of the seat tube or a portion of the derailleur mounting fixture.

The support member mount may define a support mounting axis and may be attached to the base member. The derailleur mounting axis may be orthogonal to the support mounting axis. The support member may include a support slot extending in the direction of the derailleur mounting axis. The support slot may at least partially receive the support member mount which extends transverse, e.g. orthogonal, to the derailleur mounting axis. In this embodiment, the support member mount attaches the support member to the base but also may fix the position of the support member relative to the seat tube. The support slot may define a displacement range of the support member in a direction parallel or a direction at an acute angle to the derailleur mounting axis.

In another embodiment of the invention, the support member mount may include a mounting fastener and a support bracket configured to be mounted to the base member by the mounting fastener. The support member mount may also include a bracket fastener for attaching the support member to the support bracket. The support bracket may include a support slot for receiving the bracket fastener at least partially. The support slot may define a displacement range of the support member in a direction parallel or a direction at an acute angle to the derailleur mounting axis.

The support member may be configured such that the contact surface is adapted to the shape of the support portion of the bicycle frame. The support member may be configured such that the contact surface of the support member extends at an angle relative to the derailleur mounting axis. The support member may be configured such that the contact surface has a wedge-like or concave shape. The support member may have a first surface facing the base member mounting surface at the base member and a second surface opposite the first surface, wherein the contact surface of the support member extends from the second surface in the direction of the first surface of the support member.

The base member may include a hole that extends in the direction of the support mounting axis. The support member mount may be inserted at least partially into the hole of the base member. The support member mount may include a mounting fastener such as a screw or a bolt.

The base member may include a derailleur mount engagement portion having a semi-circular or an arcuate shape. The derailleur mount engagement portion defines an orientation adjustment axis extending orthogonal to the derailleur mounting axis. The derailleur mount engagement portion may include a hole, which receives a derailleur mounting member of the derailleur mounting assembly. The derailleur mounting member may include a fastener such as a screw or bolt.

These and other features and advantages of the present invention will be understood more comprehensively from the following description of one or more embodiments of the invention, taken together with the accompanying drawings.

DETAILED DESCRIPTION OF THE PREFERRED EMBODIMENTS

Various embodiments of the invention will be described herein with reference to the drawings. It will be understood that the drawings and the description set out herein are provided for illustration only and do not limit the invention as defined by the claims appended hereto and any and all their equivalents. For example, the terms "first" and "second", "front" and "rear", "left" and "right" are used for the sake of clarity and not as terms of limitation. Moreover, the terms referred to bicycle mechanisms conventionally mounted to a bicycle and with the bicycle orientated and used in a standard fashion unless otherwise indicated.

Figure 1:
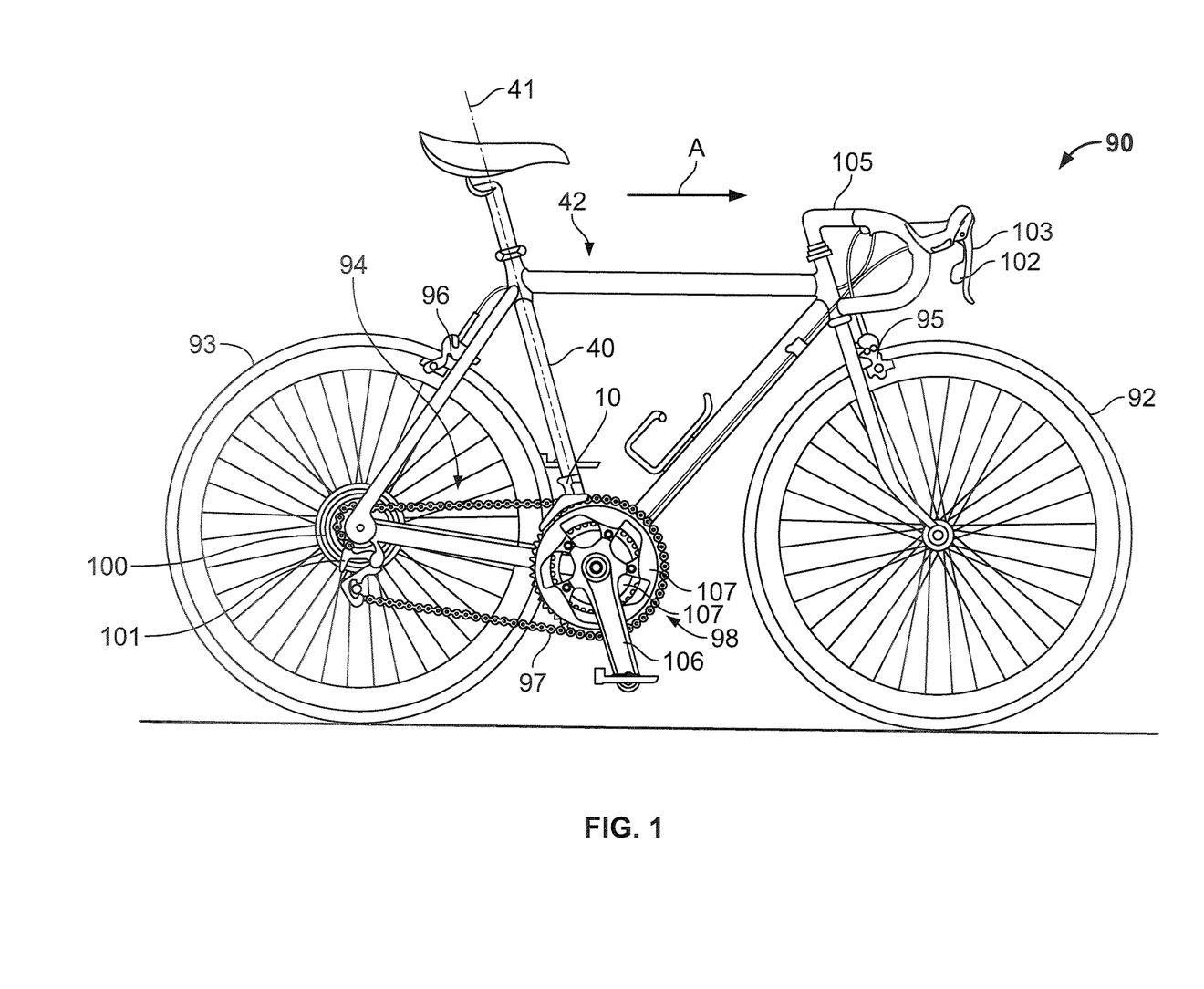
FIG. 1 is a side view of a bicycle including one embodiment of the present invention.

Referring to FIG. 1, numeral 90 generally indicates a bicycle incorporating one embodiment of the present invention. The bicycle 90 generally includes a frame 42, front and rear wheels 92, 93 rotatably attached to the frame 42, and a drivetrain 94. A front brake 95 is provided for braking the front wheel 92 and a rear brake 96 is provided for braking the rear wheel 93. The drivetrain 94 includes a chain 97, a front crank assembly 98 including a crank 106 and a plurality of chainrings 107, a front derailleur 10 attached to a seat tube 40 of the frame 42, a rear sprocket assembly 100 coaxially mounted to the rear wheel 93 and a rear derailleur 101. The front derailleur 99 is operated by a shift lever 102 located on a handlebar 105 of the frame 42. The rear derailleur 101 is also operated by a shifter (not shown) located on the handlebar 105. The front brake 95 is operated by a brake lever 103 located on the handlebar 105. The rear brake 96 is operated by a brake lever (not shown) also located on the handlebar 105. The forward riding direction is indicated by the direction of arrow "A". While the illustrated bicycle 90 is a road bike, the present invention has applications to bicycles of any type, including mountain bikes and others, as well as bicycles with mechanical (e.g. cable, hydraulic, pneumatic) and non-mechanical (e.g. wired, wireless) drive systems.

Figure 2:
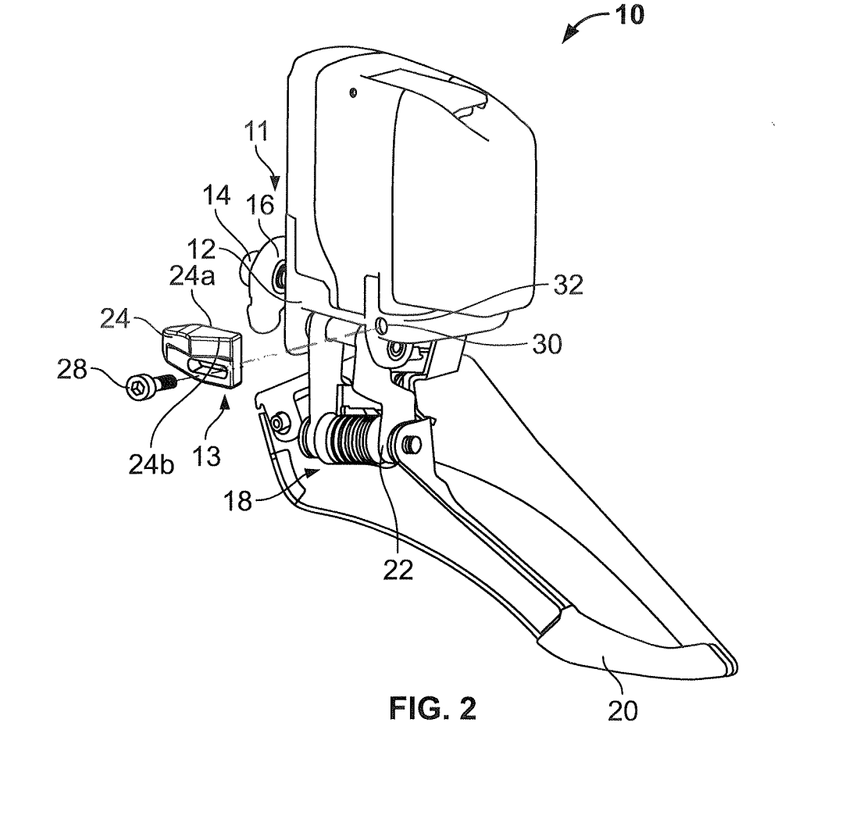
FIG. 2 is a perspective view of the derailleur according to one embodiment of the invention.

Referring to FIG. 2, the front derailleur 10 includes a base member 12 attached to a mounting portion 15 of the bicycle frame 42 (FIG. 4) by a derailleur mounting assembly 11. The derailleur mounting assembly 11 includes a fixing bolt 14 and a fixing washer 16. The fixing bolt 14 is a derailleur mounting member. The fixing bolt 14 and the fixing washer 16 are used for connecting the derailleur 10 to a derailleur mounting fixture 44 (FIG. 4) of the bicycle frame 42. The derailleur 10 further includes a linkage 18 and a chain guide 20. The linkage 18 connects the base member 12 to the chain guide 20. Only an inner link 22 of the linkage 18 is shown in FIG. 2. The linkage 18 may be a so-called four-bar linkage, wherein the base member 12 functions as one bar. In this case, the linkage includes, besides the inner link 22, an outer link (not shown), which are both pivotally connected to the base member 12. The chain guide 20 completes the four-bar linkage by pivotally connecting the links.

Figure 4:
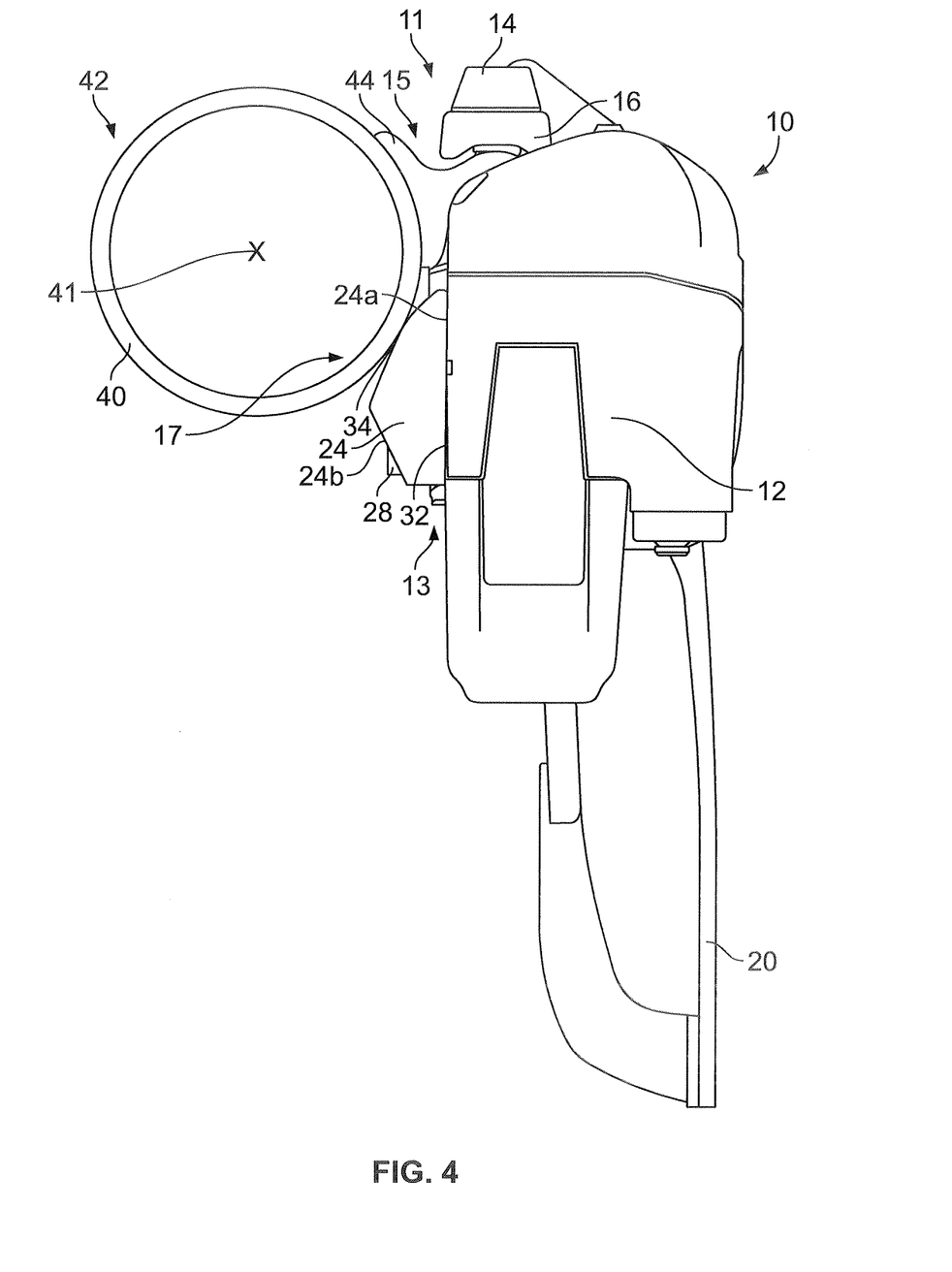
FIG. 4 is a top view of the derailleur shown in FIG. 2 attached to one exemplary mounting portion of a bicycle frame.

In FIG. 2, a support assembly 13 for supporting the derailleur 10 is shown. In this embodiment, the support assembly 13 includes a support member 24 and a support member mount 28. The support member 24 is separate from the derailleur 10. The support member 24 includes a first surface 24a facing the base member 12 and a second surface 24b opposite the first surface 24a and generally extending toward the bicycle frame (FIG. 4). The support member 24 includes a support slot 26, in which the support member mount 28 can be received at least partially. The base member 12 of the derailleur 10 includes a hole, in this embodiment a threaded hole 30, for receiving the support member mount 28, in this embodiment mounting fastener such as a screw. The support member 24 may be arranged at a support mounting surface 32 of the base member 12. The support mounting surface 32 faces the seat tube of the bicycle frame. The support member 24 is configured to slidably displace along the support mounting surface 32 for the purpose of positioning the support member 24 to support or stabilize the derailleur 10 against the bicycle frame.

Figure 3:
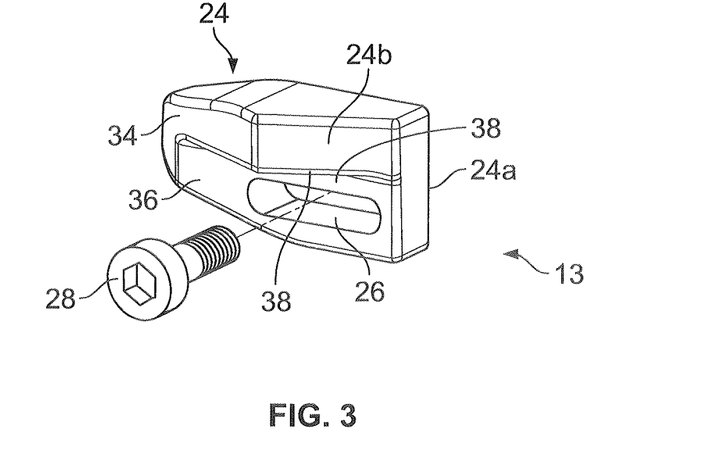
FIG. 3 is an enlarged perspective view of the support member as shown in FIG. 2.

FIG. 3 shows an enlarged perspective view of the support member 24 and the support member mount 28. The support member 24 includes a contact surface 34 for contacting a support portion 17 of the bicycle frame (FIG. 4). The contact surface 34 is inclined or tapered relative to the first surface 24a, in order to contact the support portion 17 of the bicycle frame without damaging the bicycle frame. The contact surface 34 can be linear, concave or convex in shape. The second surface 24b of the support member 24 may also be inclined relative to the first surface 24a. The support member 24 may include a recess 36 below the contact surface and the second surface 24b, in which the support slot 26 is formed. The extension of the support slot 26 represents a displacement range of the support member 24 relative to the base member 12. The recess 36 includes an upper wall 38. The wall 38 connects the recess 36 to the contact surface 34 and the second surface 24b of the support member 24.

As mentioned above, the support member mount may be a mounting fastener such as a screw 28. The screw 28 has an enlarged screw head. The recess 36 at least partially receives the screw head of screw 28. The wall 38 extends parallel to the screw 28. The screw head of screw 28 may abut at the wall 38. The recess 36 guides the displacement of the support member 24 relative to the screw 28. Hence, the wall 38 helps to maintain the vertical position of the support member 24 relative to the base member 12 during displacement of the support member 24 at the support member mounting surface 32.

FIG. 4 shows a top view of the derailleur 10 attached to the seat tube 40 of the bicycle frame 42 by the derailleur mounting fixture 44. The bicycle frame 42 includes the mounting portion 15 and the support portion 17. The derailleur 10 is mounted at the mounting portion 15 and is supported at the support portion 17. The derailleur mounting fixture 44 may be brazed, glued, welded or clamped (FIG. 6A) to the seat tube 40 or integrally formed with the seat tube 40. The derailleur 10 is attached to the derailleur mounting fixture 44 by the derailleur mounting assembly 13.

In the embodiment of FIG. 4, the contact surface 34 of the support member 24 abuts directly to an outer circumferential surface of the seat tube 40, the circumferential surface having a lengthwise extension about the frame longitudinal axis 41. The support member 24 provides, due to its abutment at the seat tube 40, a lateral support for the derailleur 10. The contact surface 34 of the support member 24 is inclined to generally conform to the shape of the seat tube 40. Due to this, the support member 24 provides additional lateral support for the derailleur 10 without damaging the seat tube 40.

Figure 5:
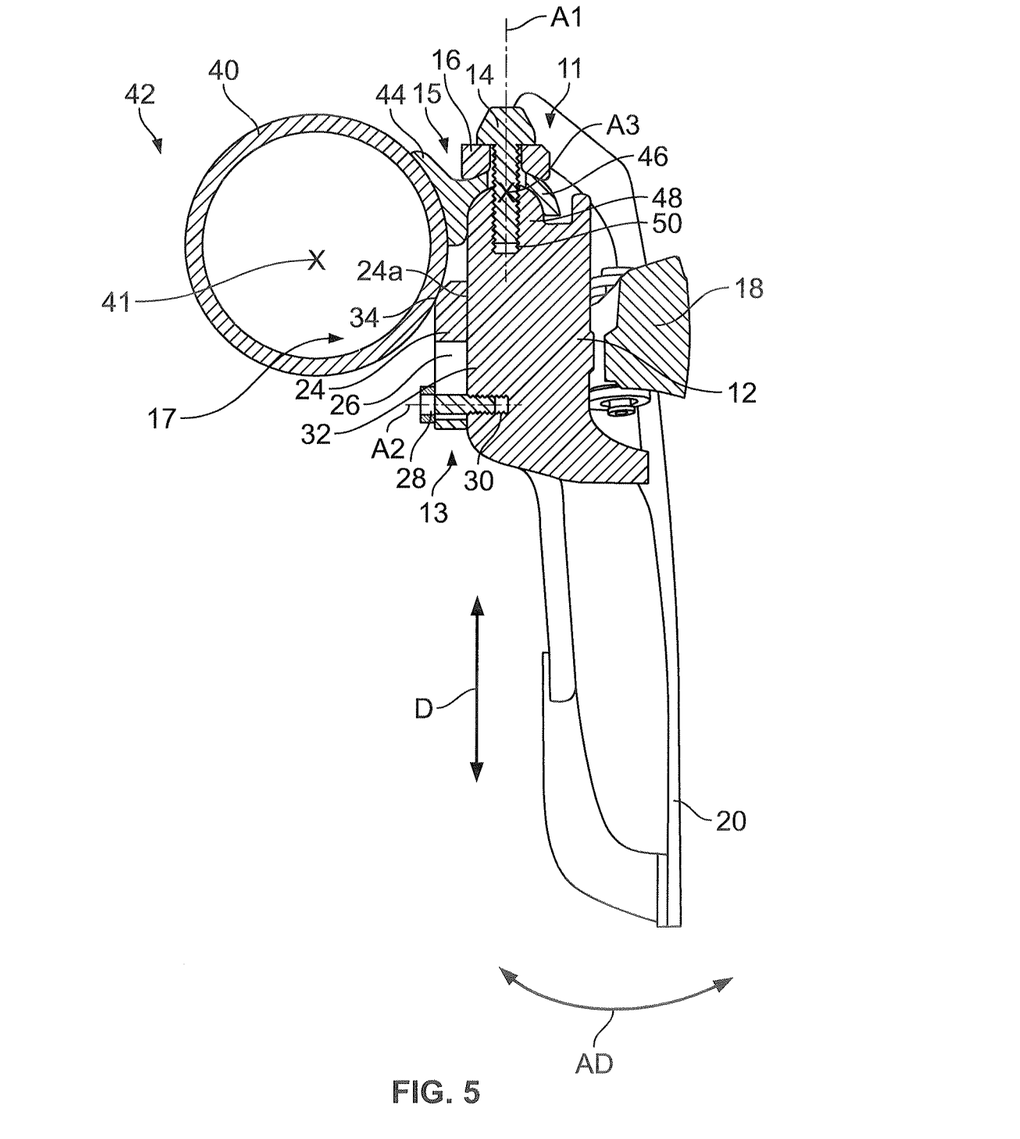
FIG. 5 is a section view of the derailleur according to FIG. 4.

FIG. 5 shows a section view of the derailleur 10 shown in FIG. 4. The derailleur mounting fixture 44 includes the derailleur mounting portion 46 having an arcuate shape. The derailleur mounting portion 46 receives a derailleur mount engagement portion 48 of the base member 12. The derailleur mount engagement portion 48 of the base member 12 has a semi-circular or arcuate shape. The shape of the derailleur mounting portion 46 generally conforms to the shape of the derailleur mount engagement portion 48 such that the derailleur mounting portion 46 is able to receive the derailleur mount engagement portion 48 of the base member 12. At the surface of the derailleur mounting portion 46 opposite the derailleur mount engagement portion 48 of the base member 12, the fixing washer 16 contacts the derailleur mounting portion 46 with its concave contact surface 34. The fixing washer 16 is connected to the derailleur mount engagement portion 48 by the fixing bolt 14. The fixing bolt 14 is at least partially received in a threaded hole 50 in the base member 12. The fixing bolt 14—the derailleur mounting member—defines a derailleur mounting axis A1.

Figure 5A:
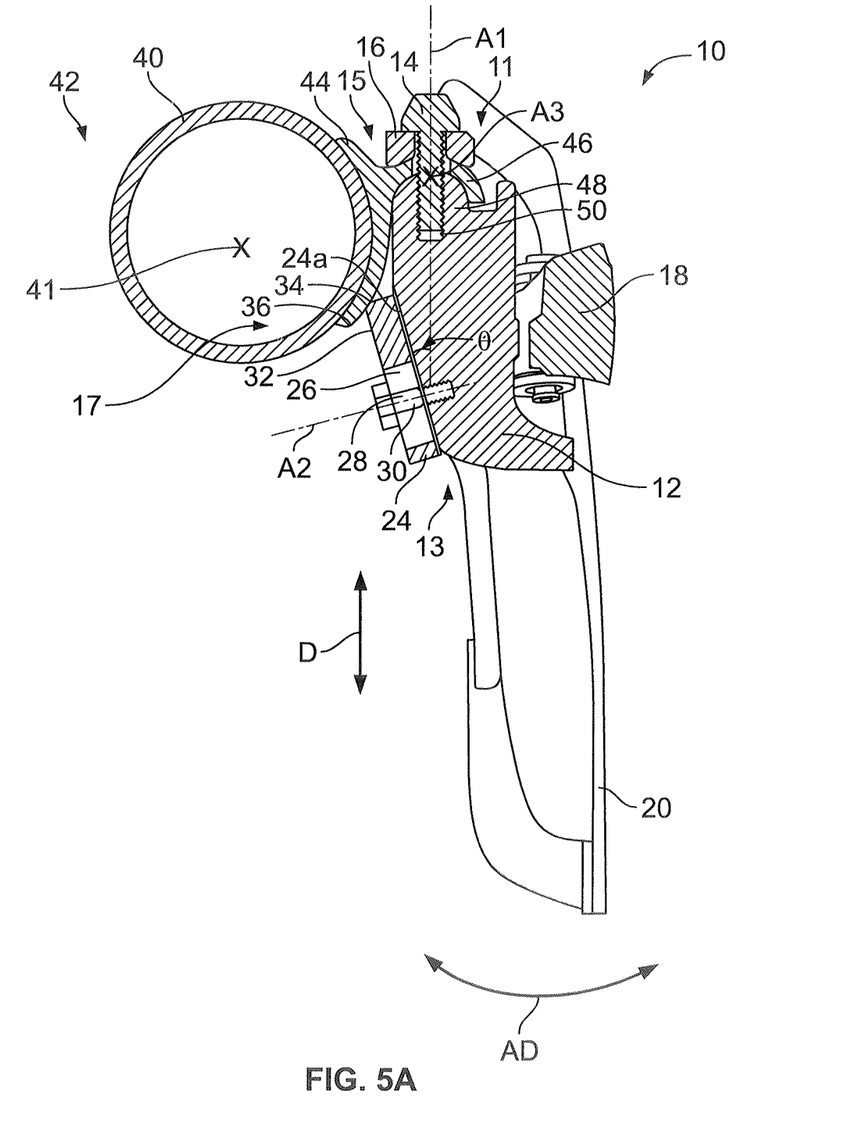
FIG. 5A is a section view of a derailleur according to another embodiment of the invention.

The support member 24 is arranged at the support mounting surface 32 of the base member 12. The support mounting surface 32 faces the frame 42. The support member 24 is mounted with the support member mount 28, i.e. the screw, to the base member 12. The screw 28 is inserted into the threaded hole 30 in the base member 12. The screw 28 is at least partially received in the support slot 26 provided in the support member 24. The extension of the support slot 26 in the direction of the derailleur mounting axis A1 (FIG. 5) represents the displacement path of the support member 24 in a direction parallel to the derailleur mounting axis A1. Both ends of the support slot 26 define the end positions of the displacement path of the support member 24. In another embodiment of the invention, the displacement path of the support member 24 may be in a direction at an acute angle θ to the derailleur mounting axis A1, see FIG. 5A.

The support member 24 is displaceable relative to the screw 28 in a direction parallel to the derailleur mounting axis A1. The displacement direction of the support member 24 is indicated by arrow D, which is parallel to the derailleur mounting axis A1. When the support member 24 is displaced while attached to base member 12 of the derailleur 10, the support member 24 displaces relative to the support member mount 28. The support member mount 28 remains stationary at the base member 12, when the support member 24 displaces along the support mounting surface 32. The support member mount 28 not only fastens the support member 24 to the base member 12, but also fixes the position of the support member 24 relative to the seat tube 40. The support member mount 28 defines a support mounting axis A2, which is orthogonal to the derailleur mounting axis A1.

The support member 24 abuts with contact surface 34 at the seat tube 40 of the bicycle frame. With the surface 24a facing the base member 12, the support member 24 abuts the support mounting surface 32. The contact surface 34 is provided at a side of the support member 24 opposite to the surface 24a. The surface 24a extends parallel to the derailleur mounting axis A1. The contact surface 34 is inclined relative to the surface 24a.

By means of the fixing bolt 14, the washer 16 and the semi-circular or arcuate shape of the derailleur mounting engagement portion 48 of the base member 12, which matches the shape of the derailleur mounting portion 46, the orientation and position of the derailleur 10 can be pivotally adjusted about a derailleur adjustment axis A3, which is parallel to the seat post of the frame and orthogonal to axis A1 and axis A2. The adjustment direction about derailleur adjustment axis A3 is indicated by arcuate arrow AD in FIG. 5.

The angular position or orientation of the derailleur is adjusted in the direction of arrow AD about axis A3. Then, the fixing bolt 14 is tightened. After tightening the fixing bolt 14, the support member 24 is moved relative to the base member 12 along the support mounting surface 32 in the direction of arrow D until the support member 24 abuts with its contact surface 34 at the seat tube 40. Then, screw 28 is tightened to maintain the position of the support member 24 at the support mounting surface 32. Therefore, additional lateral support of the derailleur 10 is achieved via the support member 24 in a fast and easy way.

Figure 6:
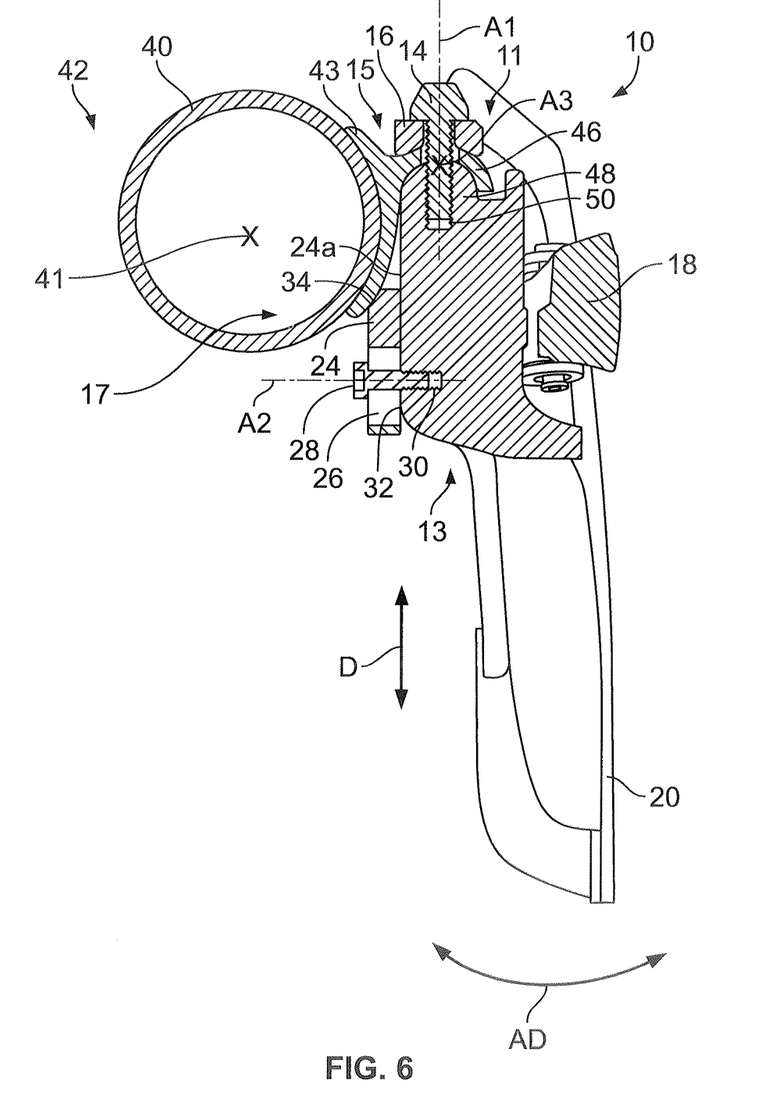
FIG. 6 is a section view of the derailleur shown in FIG. 4 attached to another exemplary mounting portion of a bicycle frame.
Figure 6A:
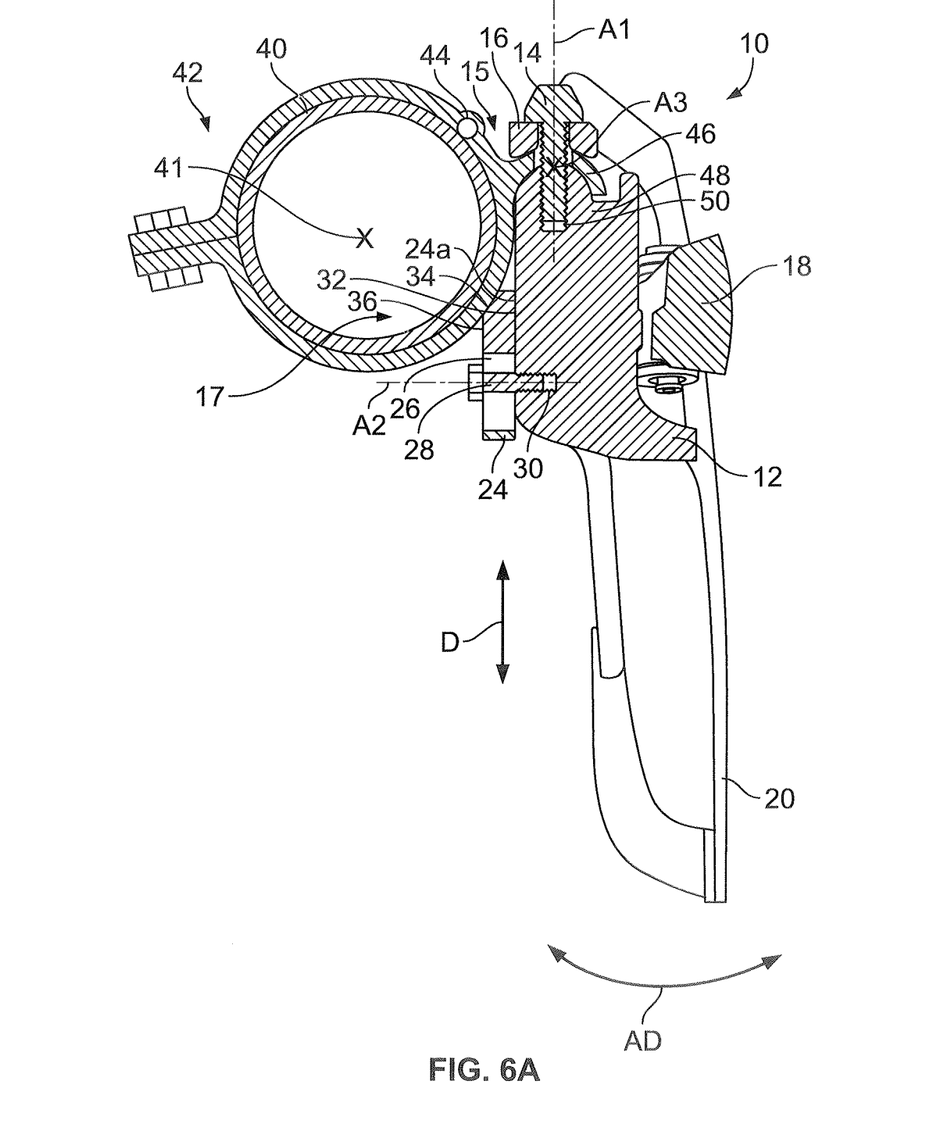
FIG. 6A is a section view of the derailleur of FIG. 4 attached to another exemplary mounting portion of a bicycle frame.

FIG. 6 shows a section view of the derailleur 10 attached to a different derailleur mounting fixture 43. When comparing FIG. 5 and FIG. 6, it becomes apparent that in FIG. 5 the support member 24 abuts directly at the outer circumferential surface of the seat tube 40, whereas in FIG. 6 the support member 24 abuts at a portion of the derailleur mounting fixture 43. The derailleur mounting fixture 43 shown in FIG. 6 covers a longer lengthwise extent of the outer circumferential surface of the seat tube 40. Due to this longer derailleur mounting fixture 43, the support member 24 abuts directly at the derailleur mounting fixture 43 with its contact surface 34. Accordingly, the support member mount 28 is, according to FIG. 6, situated toward the middle of the support slot 26, whereas in FIG. 5, the screw 28 is situated at an end of the support slot 26. In other words, the support member 24 is not moved as far in the direction of the arrow D to meet the frame in FIG. 6 as in FIG. 5. Due to the longer derailleur mounting fixture 44, the support member 24 need not be moved as much in the direction of arrow D to abut the derailleur mounting fixture 44.

Figure 7:
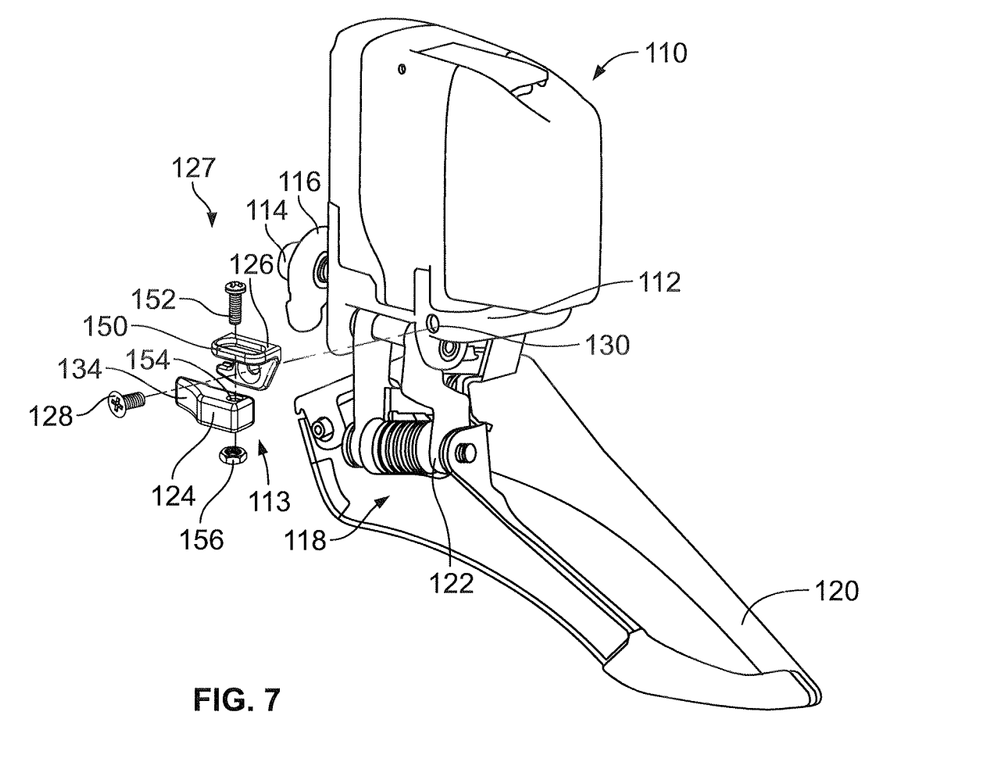
FIG. 7 is a perspective view of a derailleur according to another embodiment of the invention.

FIG. 7 shows a perspective view of a derailleur 110 according to another embodiment. In this embodiment, a support assembly 113 includes a support member 124 and a support member mount 127. The support member mount 127 includes a support bracket 150, a bracket fastener 152 and a mounting fastener 128. The support bracket 150 includes a support slot 126 for positioning the support member 124 relative to the base member 112. The support slot 126 is adapted to at least partially receive the bracket fastener 152. By means of the bracket fastener 152, the position of the support member 124 with respect to the base member 112 can be defined in the support slot 126. The support member 124, according to this embodiment, includes a through-hole 154, through which the bracket fastener 152 extends. The bracket fastener 152 may be a screw which extends through the support member 124 and is secured to the support member 124 by a nut 156.

Figure 8:
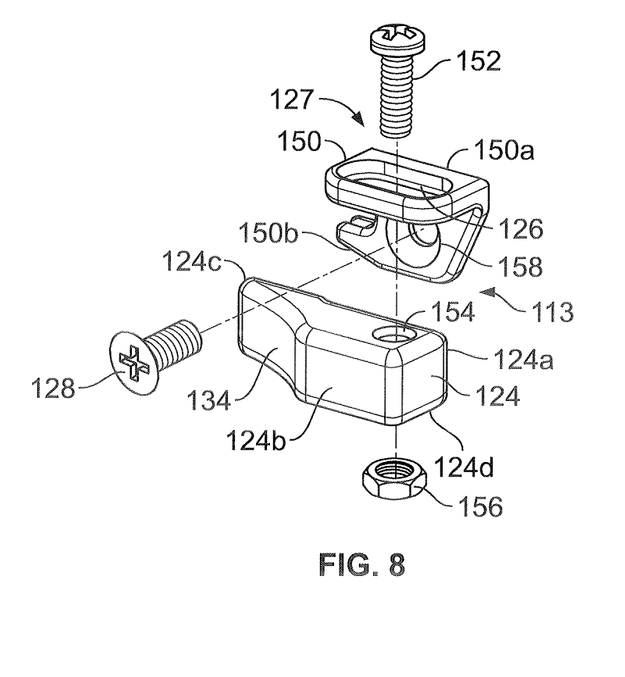
FIG. 8 is an enlarged perspective view of the support member shown in FIG. 7.

FIG. 8 shows a perspective exploded view of the support assembly 113. The mounting bracket 150 includes two legs 150a and 150b. The upper leg 150a includes the support slot 126 and the lower leg 150b includes a hole 158 for receiving the mounting fastener 128. Both legs 150a and 150b extend perpendicular to each other. Both legs 150a and 150b are further configured to abut at the first surface 124a of the support member 124 and at an upper surface 124c of the support member 124. The first surface 124a and the second surface 124b of the support member 124 extend parallel to each other.

The support member 124 includes a contact surface 134, which has, according to this embodiment, a concave shape. The contact surface 134 therefore extends arcuately from the second surface 124b in the direction of the first surface 124a.

The through-hole 154 extends through the support member 124. The support member 124 contacts, with its upper surface 124c, the leg 150a of the bracket 150 including the support slot 126. A lower surface 124d of the support member 124 contacts the nut 156.

The bracket fastener 152 sets the position of the support member 124 relative to the mounting bracket 150 within the extension of the support slot 126. The mounting bracket 150 is mounted to the derailleur 112 by the mounting fastener, i.e. the screw 128. When the mounting bracket 150 is attached to the derailleur 110, the support member 124 is mounted to the mounting bracket 150 by the bracket fastener 152 and the nut 156.

Figure 9:
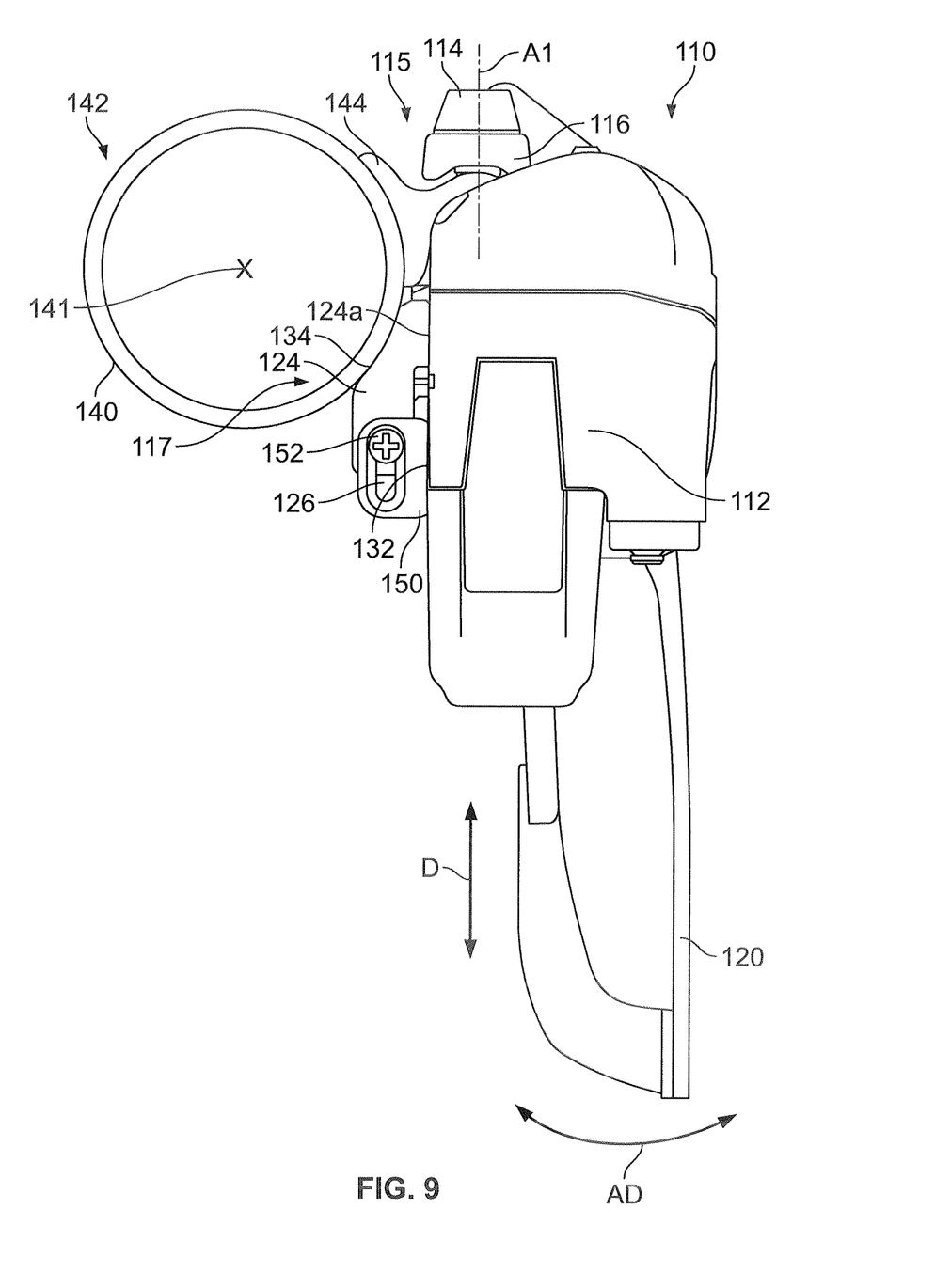
FIG. 9 is a top view of the derailleur of FIG. 7 attached to a mounting portion of a bicycle frame.

FIG. 9 shows a top view of the derailleur 110, attached to a seat tube 140 of a bicycle frame having a longitudinal axis 141. The mounting bracket 150 includes the support slot 126, in which the bracket fastener 152 is partially received. The support member 124 can be moved in the direction of arrow D parallel to the direction of the axis A1. The extension of the support slot 126 in the direction of the arrow D, i.e. in the direction of the axis Al, represents the displacement path of the support member 124 in the direction of the arrow D.

The orientation and position of the derailleur 110 is adjusted by the derailleur mounting member 114 together with the base member 112. Then, the derailleur mounting member 114 is tightened. After tightening the derailleur mounting member 114, the support member 124 is displaced in the direction of the arrow D until the contact surface 134 of the support member 124 contacts the outer circumferential surface of the seat tube 140. Then the bracket fastener 152 is tightened, inside of the extension of the support slot 126, to fix the position of the support member 124 relative to the seat tube 142.

The shape of the contact surface 134 is adapted to the shape of the seat tube 140, to avoid damaging the seat tube 140. That is, the contact surface 134 according to this embodiment is concave.

While this invention has been described by reference to several embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. A support assembly for supporting a front derailleur at a bicycle frame, the bicycle frame including a longitudinal axis, a support portion arranged lengthwise about the longitudinal axis and a mounting portion projecting outwardly from the support portion, the front derailleur including a base member attachable to the mounting portion of the bicycle frame at a derailleur mounting axis, the base member including a support mounting surface facing the support portion of the bicycle frame, the support assembly comprising:
a support member configured to displace relative to the base member along the support mounting surface of the base member, the support member including a contact surface configured to contact the support portion of the bicycle frame; and
a support member mount configured to attach the support member to the support mounting surface of the base member of the front derailleur.

2. The support assembly of claim 1, wherein the support member mount defines a support mounting axis and is configured to be attached to the base member.

3. The support assembly of claim 2, wherein the derailleur mounting axis is orthogonal to the support mounting axis.

4. The support assembly of claim 2, wherein the support member mount is configured to be received in a hole of the base member of the front derailleur, the hole extending in the direction of the support mounting axis.

5. The support assembly of claim 4, wherein the support member mount includes a mounting fastener received in the hole of the base member of the front derailleur.

6. The support assembly of claim 1, wherein the support member includes a support slot extending in a direction parallel to the derailleur mounting axis.

7. The support assembly of claim 6, wherein the support slot at least partially receives the support member mount, the support member mount defining a support mounting axis orthogonal to the derailleur mounting axis.

8. The support assembly of claim 7, wherein the support slot defines a displacement range of the support member in the direction parallel to the derailleur mounting axis.

9. The support assembly of claim 8, wherein the support member is configured such that the contact surface of the support member is adapted to the shape of the support portion of the bicycle frame.

10. The support assembly of claim 8, wherein the support member is configured such that the contact surface extends at an angle relative to the derailleur mounting axis.

11. The support assembly of claim 10, wherein the support member has a first surface facing the base member of the front derailleur and a second surface opposite the first surface, wherein the contact surface extends from the second surface in the direction of the first surface.

12. The support assembly of claim 8, wherein the support member is configured such that the contact surface has a concave shape.

13. The support assembly of claim 7, wherein the support member mount is configured to be received in a hole of the base member of the front derailleur, the hole extending in the direction of the support mounting axis.

14. The support assembly of claim 13, wherein the support member mount includes a mounting fastener received in the hole of the base member of the front derailleur.

15. The support assembly of claim 1, wherein the support member includes a support slot extending in a direction at an acute angle to the derailleur mounting axis.

16. The support assembly of claim 1, wherein the support member mount includes a mounting fastener and a support bracket configured to be attached to the base member by the mounting fastener.

17. The support assembly of claim 16, wherein the support member mount includes a bracket fastener, the support member attached to the support bracket by the bracket fastener.

18. The support assembly of claim 17, wherein the support bracket includes a support slot for receiving the bracket fastener at least partially.

19. The support assembly of claim 18, wherein the support slot defines a displacement range of the support member in a direction parallel to the derailleur mounting axis.

20. The support assembly of claim 19, wherein the mounting fastener defines a support mounting axis.

21. The support assembly of claim 20, wherein the derailleur mounting axis is orthogonal to the support mounting axis.

22. The support assembly of claim 20, wherein the mounting fastener is configured to be received in a hole of the base member of the front derailleur, the hole extending in the direction of the support mounting axis.

23. The support assembly of claim 16, wherein the support member is configured such that the contact surface of the support member is adapted to the shape of the support portion of the bicycle frame.

24. The support assembly of claim 16, wherein the support member is configured such that the contact surface extends at an angle relative to the derailleur mounting axis.

25. The support assembly of claim 24, wherein the support member has a first surface facing the base member of the front derailleur and a second surface opposite the first surface, wherein the contact surface extends from the second surface in the direction of the first surface.

26. The support assembly of claim 16, wherein the support member is configured such that the contact surface has a concave shape.

27. The support assembly of claim 1, wherein the support member is configured such that the contact surface of the support member is adapted to the shape of the support portion of the bicycle frame.

28. The support assembly of claim 1, wherein the support member is configured such that the contact surface extends at an angle relative to the derailleur mounting axis.

29. The support assembly of claim 28, wherein the support member has a first surface facing the base member of the front derailleur and a second surface opposite the first surface, wherein the contact surface extends from the second surface in the direction of the first surface.

30. The support assembly of claim 1, wherein the support member is configured such that the contact surface has a concave shape.

31. A front derailleur attachable to a bicycle frame including a longitudinal axis, a support portion arranged lengthwise about the longitudinal axis and a mounting portion, the front derailleur comprising:
a base member including a support mounting surface facing the support portion of the bicycle frame;
a derailleur mounting assembly including a derailleur mounting member configured to attach the base member to the mounting portion of the bicycle frame at a derailleur mounting axis;
a linkage movably coupled to the base member;
a chain guide movably coupled to the linkage for contacting a chain; and
a support assembly for supporting the front derailleur at the support portion of the bicycle frame, the support assembly including:
a support member configured to displace relative to the base member along the support mounting surface, the support member including a contact surface configured to contact the support portion of the bicycle frame, and
a support member mount attaching the support member to the support mounting surface of the base member.

32. The front derailleur of claim 31, wherein the support member mount defines a support mounting axis and is attached to the base member.

33. The front derailleur of claim 32, wherein the derailleur mounting axis is orthogonal to the support mounting axis.

34. The front derailleur of claim 33, wherein the base member includes a derailleur mount engagement portion having an arcuate shape, which defines an orientation adjustment axis extending orthogonal to the derailleur mounting axis.

35. The front derailleur of claim 34, wherein the derailleur mount engagement portion includes a hole, which receives the derailleur mounting member.

36. The front derailleur of claim 35, wherein the derailleur mounting member includes a fastener received in the hole of the derailleur mount engagement portion.

37. The front derailleur of claim 32, wherein the support member mount is configured to be received in a hole of the base member of the front derailleur, the hole extending in the direction of the support mounting axis.

38. The front derailleur of claim 37, wherein the support member mount includes a mounting fastener received in the hole of the base member of the front derailleur.

39. The front derailleur of claim 31, wherein the support member includes a support slot extending in a direction parallel to the derailleur mounting axis.

40. The front derailleur of claim 39, wherein the support slot at least partially receives the support member mount, the support member mount defining a support mounting axis orthogonal to the derailleur mounting axis.

41. The front derailleur of claim 40, wherein the support slot defines a displacement range of the support member in the direction parallel to the derailleur mounting axis.

42. The front derailleur of claim 41, wherein the base member includes a derailleur mount engagement portion having an arcuate shape, which defines an orientation adjustment axis extending orthogonal to the derailleur mounting axis.

43. The front derailleur of claim 42, wherein the derailleur mount engagement portion includes a hole, which receives the derailleur mounting member.

44. The front derailleur of claim 43, wherein the derailleur mounting member includes a fastener received in the hole of the derailleur mount engagement portion.

45. The front derailleur of claim 41, wherein the support member is configured such that the contact surface of the support member is adapted to the shape of the support portion of the bicycle frame.

46. The front derailleur of claim 41, wherein the support member is configured such that the contact surface extends at an angle relative to the derailleur mounting axis.

47. The front derailleur of claim 41, wherein the support member is configured such that the contact surface has a concave shape.

48. The front derailleur of claim 47, wherein the support member has a first surface facing the base member of the front derailleur and a second surface opposite the first surface, wherein the contact surface extends from the second surface in the direction of the first surface.

49. The front derailleur of claim 40, wherein the support member mount is configured to be received in a hole of the base member of the front derailleur, the hole extending in the direction of the support mounting axis.

50. The front derailleur of claim 49, wherein the support member mount includes a mounting fastener received in the hole of the base member of the front derailleur.

51. The front derailleur of claim 31, wherein the support member includes a support slot extending in a direction at an acute angle to the derailleur mounting axis.

52. The front derailleur of claim 31, wherein the support member mount includes a mounting fastener and a support bracket configured to be attached to the base member by the mounting fastener.

53. The front derailleur of claim 52, wherein the support member mount includes a bracket fastener, the support member attached to the support bracket by the bracket fastener.

54. The front derailleur of claim 53, wherein the support bracket includes a support slot for receiving the bracket fastener at least partially.

55. The front derailleur of claim 54, wherein the support slot defines a displacement range of the support member in a direction parallel to the derailleur mounting axis.

56. The front derailleur of claim 55, wherein the mounting fastener defines a support mounting axis.

57. The front derailleur of claim 56, wherein the derailleur mounting axis is orthogonal to the support mounting axis.

58. The front derailleur of claim 56, wherein the mounting fastener is configured to be received in a hole of the base member of the front derailleur, the hole extending in the direction of the support mounting axis.

59. The front derailleur of claim 55, wherein the base member includes a derailleur mount engagement portion having an arcuate shape, which defines an orientation adjustment axis extending orthogonal to the derailleur mounting axis.

60. The front derailleur of claim 59, wherein the derailleur mount engagement portion includes a hole, which receives the derailleur mounting member.

61. The front derailleur of claim 60, wherein the derailleur mounting member includes a fastener received in the hole of the derailleur mount engagement portion.

62. The front derailleur of claim 53, wherein the support member is configured such that the contact surface of the support member is adapted to the shape of the support portion of the bicycle frame.

63. The front derailleur of claim 53, wherein the support member is configured such that the contact surface extends at an angle relative to the derailleur mounting axis.

64. The front derailleur of claim 63, wherein the support member has a first surface facing the base member of the front derailleur and a second surface opposite the first surface, wherein the contact surface extends from the second surface in the direction of the first surface.

65. The front derailleur of claim 53, wherein the support member is configured such that the contact surface has a concave shape.

66. The front derailleur of claim 31, wherein the support member is configured such that the contact surface of the support member is adapted to the shape of the support portion of the bicycle frame.

67. The front derailleur of claim 31, wherein the support member is configured such that the contact surface extends at an angle relative to the derailleur mounting axis.

68. The front derailleur of claim 67, wherein the support member has a first surface facing the base member of the front derailleur and a second surface opposite the first surface, wherein the contact surface extends from the second surface in the direction of the first surface.

69. The front derailleur of claim 31, wherein the support member is configured such that the contact surface has a concave shape.

70. The front derailleur of claim 31, wherein the base member includes a derailleur mount engagement portion having an arcuate shape, which defines an orientation adjustment axis extending orthogonal to the derailleur mounting axis.

71. The front derailleur of claim 70, wherein the derailleur mount engagement portion includes a hole, which receives the derailleur mounting member.

72. The front derailleur of claim 71, wherein the derailleur mounting member includes a fastener received in the hole of the derailleur mount engagement portion.

* * * * *